US009789649B2

(12) United States Patent
Buser et al.

(10) Patent No.: US 9,789,649 B2
(45) Date of Patent: Oct. 17, 2017

(54) PRINTER WITH LASER SCANNER AND TOOL-MOUNTED CAMERA

(71) Applicant: MakerBot Industries, LLC, Brooklyn, NY (US)

(72) Inventors: Anthony James Buser, Reading, PA (US); Ariel Douglas, Brooklyn, NY (US); Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 720 days.

(21) Appl. No.: 13/786,051

(22) Filed: Mar. 5, 2013

(65) Prior Publication Data

US 2014/0036035 A1 Feb. 6, 2014

Related U.S. Application Data

(63) Continuation of application No. 13/623,996, filed on Sep. 21, 2012, now Pat. No. 9,172,829.

(60) Provisional application No. 61/677,749, filed on Jul. 31, 2012.

(51) Int. Cl.
*B33Y 30/00* (2015.01)
*B33Y 40/00* (2015.01)
*B33Y 50/00* (2015.01)
*B33Y 50/02* (2015.01)
*B33Y 80/00* (2015.01)
(Continued)

(52) U.S. Cl.
CPC ...... *B29C 67/0051* (2013.01); *B29C 67/0055* (2013.01); *B33Y 10/00* (2014.12); *B33Y 30/00* (2014.12); *B33Y 40/00* (2014.12); *B33Y 50/00* (2014.12); *B33Y 50/02* (2014.12); *B33Y 80/00* (2014.12)

(58) Field of Classification Search
CPC .................................................. B29C 67/0051
See application file for complete search history.

(56) References Cited

U.S. PATENT DOCUMENTS

| 5,412,449 A | * | 5/1995 | Lam ........................ G03B 35/24 355/22 |
| 6,027,682 A | * | 2/2000 | Almquist ............ B29C 67/0066 264/308 |
| 6,481,268 B1 | | 11/2002 | Povey et al. |

(Continued)

FOREIGN PATENT DOCUMENTS

| WO | WO-2011144454 | 11/2011 |
| WO | WO-2012061945 | 5/2012 |
| WO | WO-2014022134 | 2/2014 |

OTHER PUBLICATIONS

State-of-the-art and Applications of 3D Imaging Sensors in Industry, Cultural Heritage, Medicine, and Criminal Investigation, 2009.*

(Continued)

*Primary Examiner* — Ibrahim Siddo

(74) *Attorney, Agent, or Firm* — Strategic Patents, P.C.

(57) ABSTRACT

A three-dimensional printer includes a laser line scanner and hardware to rotate the scanner relative to an object on a build platform. In this configuration, three-dimensional surface data can be obtained from the object, e.g., for use as an input to subsequent processing steps such as the generation of tool instructions to fabricate a three-dimensional copy of the object, or various surfaces thereof.

15 Claims, 4 Drawing Sheets

(51) Int. Cl.
    *B29C 67/00*         (2017.01)
    *B33Y 10/00*         (2015.01)

(56) References Cited

U.S. PATENT DOCUMENTS

| | | | |
|---|---|---|---|
| 6,529,627 B1* | 3/2003 | Callari | G06K 9/2036 345/653 |
| 6,804,568 B1* | 10/2004 | Miyazaki | G05B 19/4097 700/17 |
| 7,168,935 B1* | 1/2007 | Taminger | B23K 15/0073 219/121.12 |
| 2001/0007334 A1 | 7/2001 | Wilz, Sr. et al. | |
| 2002/0039024 A1 | 4/2002 | Fuderer et al. | |
| 2002/0162886 A1 | 11/2002 | Arsenault et al. | |
| 2002/0175971 A1 | 11/2002 | Otsuki | |
| 2004/0252187 A1 | 12/2004 | Alden | |
| 2005/0068523 A1 | 3/2005 | Wang et al. | |
| 2007/0008600 A1* | 1/2007 | Okada | G02B 26/122 359/199.1 |
| 2007/0086620 A1* | 4/2007 | Arai | G01B 5/008 382/100 |
| 2007/0172599 A1 | 7/2007 | Lewis et al. | |
| 2007/0241482 A1 | 10/2007 | Giller et al. | |
| 2007/0285668 A1 | 12/2007 | Bertola et al. | |
| 2009/0151591 A1 | 6/2009 | Ohlsson et al. | |
| 2009/0179355 A1 | 7/2009 | Wicker et al. | |
| 2009/0243156 A1 | 10/2009 | Morohoshi et al. | |
| 2010/0298705 A1 | 11/2010 | Pelissier et al. | |
| 2010/0310786 A1 | 12/2010 | Dunne | |
| 2012/0113473 A1 | 5/2012 | Pettis | |
| 2013/0132038 A1 | 5/2013 | Regan et al. | |
| 2014/0036034 A1 | 2/2014 | Boyer et al. | |

OTHER PUBLICATIONS

U.S. "U.S. Appl. No. 13/623,996, Non-Final Office Action dated Mar. 17, 2015", 25 pages.
WIPO, "International Application Serial No. PCT/US13/51463, Preliminary Report on Patentability dated Feb. 12, 2015", 9 pages.
"International Application Serial No. PCT/US13/51463, Search Report and Written Opinion dated Mar. 10, 2014", 10 pages.
U.S. "U.S. Appl. No. 13/623,996, Notice of Allowance dated Jul. 23, 2015", 5 pages.
"3D FUNPOD", http://phlatboyz.blogspot.com/2012/02/3d-printed-micro-3d-3d-funpod-3d-funpod.html NPL-19 Feb. 8, 2012, pp. 1-3.
"Ultra-Bot 3D Printer, William Steele", http://www.kickstarter.com/projects/wjsteele/ultra-bot-3d-printer/posts/362119NPL-20 Dec. 4, 2012, pp. 1-17.

* cited by examiner

PRINTER WITH LASER SCANNER AND TOOL-MOUNTED CAMERA

RELATED APPLICATIONS

This application is a continuation of U.S. patent application Ser. No. 13/623,996 filed Sep. 21, 2012, which claims the benefit of U.S. App. No. 61/677,749 filed on Jul. 31, 2012, each of which the entire content is hereby incorporated by reference.

BACKGROUND

There remains a need for three-dimensional data acquisition to augment the use and operation of a three-dimensional fabrication system.

SUMMARY

A three-dimensional printer includes a laser line scanner and hardware to rotate the scanner relative to an object on a build platform. In this configuration, three-dimensional surface data can be obtained from the object, e.g., for use as an input to subsequent processing steps such as the generation of tool instructions to fabricate a three-dimensional copy of the object, or various surfaces thereof.

The laser line scanner may generally include a laser line projector and a camera or similar imaging device. In one aspect, a turntable or the like may be integrated into the build platform to permit scanning around the object with a fixed laser line scanner.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a series of two dimensional paths to form a three-dimensional object from a digital model, it will be understood that numerous additive fabrication techniques are known in the art including without limitation multijet printing, stereolithography, Digital Light Processor ("DLP") three-dimensional printing, selective laser sintering, and so forth. Any such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
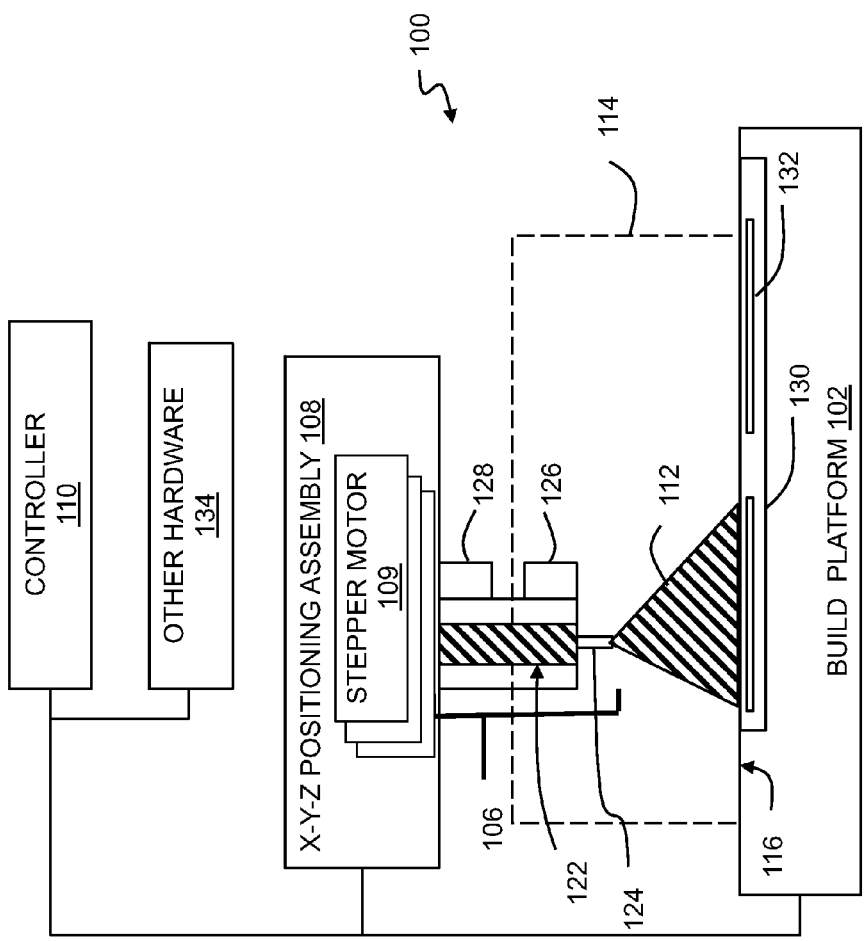
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art.

The other hardware 134 may include a temperature sensor positioned to sense a temperature of the surface of the build platform 102, the object 112 (or a surface of the object 112), the working volume 114, the extruder 126, and/or any other system components. This may, for example, include a thermistor or the like embedded within or attached below the surface of the build platform 102. This may also or instead include an infrared detector or the like directed at the surface 116 of the build platform 102 or the object 112.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

The other hardware 134 may include a port for a removable and replaceable memory such as an SD card so that printable objects and/or tool instructions can be provided to the printer 100 on a portable memory.

In general, the above system can build a three-dimensional object by depositing lines of build material in successive layers—two-dimensional patterns derived from the cross-sections of the three-dimensional object. As described below, three-dimensional printing may be augmented with the acquisition of three-dimensional data, e.g., from a rotating build platform and a laser line scanner.

Figure 2:
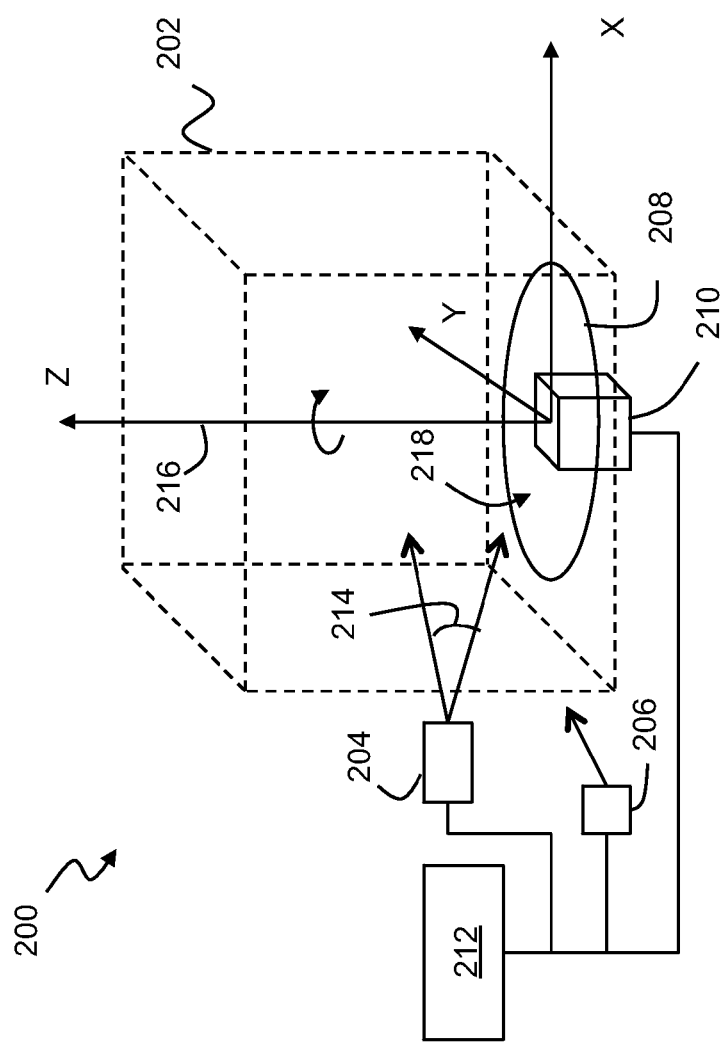
FIG. 2 shows a three-dimensional printer with a laser line scanner.

FIG. 2 shows a three-dimensional printer with a laser line scanner. In general, the three-dimensional printer may be any fabrication system, such as any of the three-dimensional printers described above or any other fabrication system using fused deposition modeling, stereolithography, Digital Light Processing ("DLP") three-dimensional printing, selective laser sintering, or any other additive fabrication system/process. The device 200 may include a working volume 202, a laser line projector 204, a camera 206, a build platform 208, a build platform drive 210, and a controller 212 such as any of the controllers described above to coordinate and control operation of components of the device 200.

The working volume 202 may be a working or build volume of a three-dimensional printer such as the device 200 depicted in the figure. It will be appreciated that the principles of the invention may be equally applicable to a scanner that is independent of the device 200, in which case the working volume 202 may simply be a scanning volume for a three-dimensional scanner that uses laser light scanning to capture and process three-dimensional data as described below.

The laser line projector 204 may include a laser light source such as a red laser pointer of class 1 or 1M and any arrangement of components to distribute a line of laser light over an arc 214 to provide a plane of laser illumination. This may include any suitable active or passive optical elements such as a lens that distributes light across the plane in an arc, or moving mirror or other mechanism that oscillates to direct the light across the plane. Thus it will be understood that the term "line" as used herein may refer to an actual line, e.g., through an optical spreader, or a laser dot that moves through a line or arc with sufficient speed to permit capture of a line with the camera 206. It will further be appreciated that a simple laser dot may also or instead be employed, although this may require additional image capture, object movement, and/or laser light source movement. All such variations are intended to fall within the scope of a laser line projector 204 as contemplated herein. Similarly, a laser line may include a line or any number and arrangement of laser dots capable of achieving similar affects. The laser line projector 204 may be directed toward the working volume 202 in order to illuminate an object within the working volume 202. In one aspect, the laser line projector 204 may be on top of the working volume 202 and project downward. The laser line projector 204 may also or instead be affixed to, or otherwise mounted in a fixed relationship to, a tool head or the like, providing x-y-z positioning capabilities using the corresponding hardware of a fabrication system.

The camera 206 may include any imaging hardware and/or software for capturing electronic images, including without limitation digital cameras, digital video devices, and so forth. The camera 206 may be directed toward the working volume 202 in order to capture images of an object within the working volume. The camera 206 may be positioned at a different location than the laser line projector 204 about an axis 216 of the working volume 202, such as the z-axis, in order to permit resolution of three-dimensional data from a laser line contour cast by the laser line projector 204 onto the object. More generally, the camera 206 may have any pose useful for capturing three-dimensional data from a laser line projected by the laser line projector 204. The camera 206 may, for example, be positioned on top of the working volume 202 and/or affixed to, or otherwise mounted in a fixed relationship to, a tool head such as the extruder 106 to permit positioning of the camera 206 relative to the working volume 202 using the x-y-z positioning assembly 108. The object is not shown in FIG. 2 for purposes of simplicity, but it will be understood that the object may be any object within the working volume such as an object resting on the build platform 208.

The build platform 208 may be positioned within the working volume 202, and may include a planar surface 218 to support an object during scanning or fabrication. In general, the build platform 208 may be any of the build platforms described above.

The build platform 208 may be coupled to a rotational drive 210 to rotate the build platform 208 about an axis 216 perpendicular to the planar surface 218, such as the z-axis for the build platform 208 or any axis parallel to the z-axis, or more generally, any axis passing through the working volume 202. In this manner, an object may be rotated through a number of poses relative to the laser line source 204 and the camera 206 in order to permit extraction of three-dimensional data from various surfaces of the object.

While this arrangement provides convenient access to various poses of the object, it will be understood that various other hardware arrangements may be deployed to similar affect. For example, the camera 206 and/or the laser line source 204 may revolve around the working volume 202 to obtain multiple views of the object. Multiple cameras may also or instead be deployed to capture images from various poses, and/or a number of mirrors may be employed to direct the laser beam from the laser line source 204 through the working volume 202 in various orientations. Thus while emphasis here is on a simple rotating build platform, this exemplary embodiment is not intended to limit the scope of this disclosure. In this more general context, it will be understood that rotating an object about an axis refers to the relative orientation of the object to the laser light source 204 and/or camera 206, and does not require any specific motion of the build platform 208 or the object. For example, the object may be "rotated" on the axis 216 while the object and the build platform 208 remain stationary by revolving or otherwise directing the imaging hardware to various poses around the object, in which case the axis 216 is defined with respect to motion of the imaging hardware rather than motion of the build platform 208.

The rotational drive 210 may include any combination of motors, gears, and so forth suitable to rotate the build platform 208 about an axis such as the axis 216 described above. The axis 216 may, for example, include the z-axis of a fabrication system, or any parallel axis thereto, or any other suitable axis upon which the object can be rotated within the working volume 202.

The controller 212 may be any processor or combination of processors or other processing circuitry that can control operation of the rotational drive 210, the laser line projector 204, and the camera 206 to capture three-dimensional data such as a point cloud from a surface of the object within the working volume 202. To this end, the controller 212 may provide control signals to, and/or receive data from other components of the device 200 to obtain three-dimensional data for the surface of the object. The controller 212 may be any of the controllers described above. This may include a controller or processor installed in the device 200, or a processor or the like separate from the device 200 such as within an attached computer, or any combination of these.

In general, the controller 212 may operate the rotational drive 210 to rotate the build platform 208 about an axis while operating the laser line source 204 to illuminate a surface of the object with a laser line to provide a contour line of laser light on the surface. The controller 212 may concurrently operate the camera 206 to capture images of the surface illuminated with the laser line. The controller 212 may be further configured with suitable programming to process the images to obtain three-dimensional data. The controller may for example be configured to extract a number of two dimensional outlines of the object at a number of positions along the axis 216 from the three-dimensional data, thereby providing planar outline data such as cross sections of the object along the axis 216. As described below in greater detail, the controller 212 may be further configured to generate tool instructions such as a tool path for the device 200 based on the planar outline data, the tool instructions including instructions to the device 200 to fabricate a three-dimensional copy of the surface of the object. By going directly from the acquired point cloud and/or planar outline data to tool instructions such as a tool path, the methods and systems described herein can advantageously omit the computationally expensive creation of interim computer models such as a polygonal mesh. The resulting digital representation may also be more amenable to direct manual or computer manipulation because the planar outline data corresponds more intuitively to tool instructions found in, e.g., a tool path for a three-dimensional printer.

Figure 3:
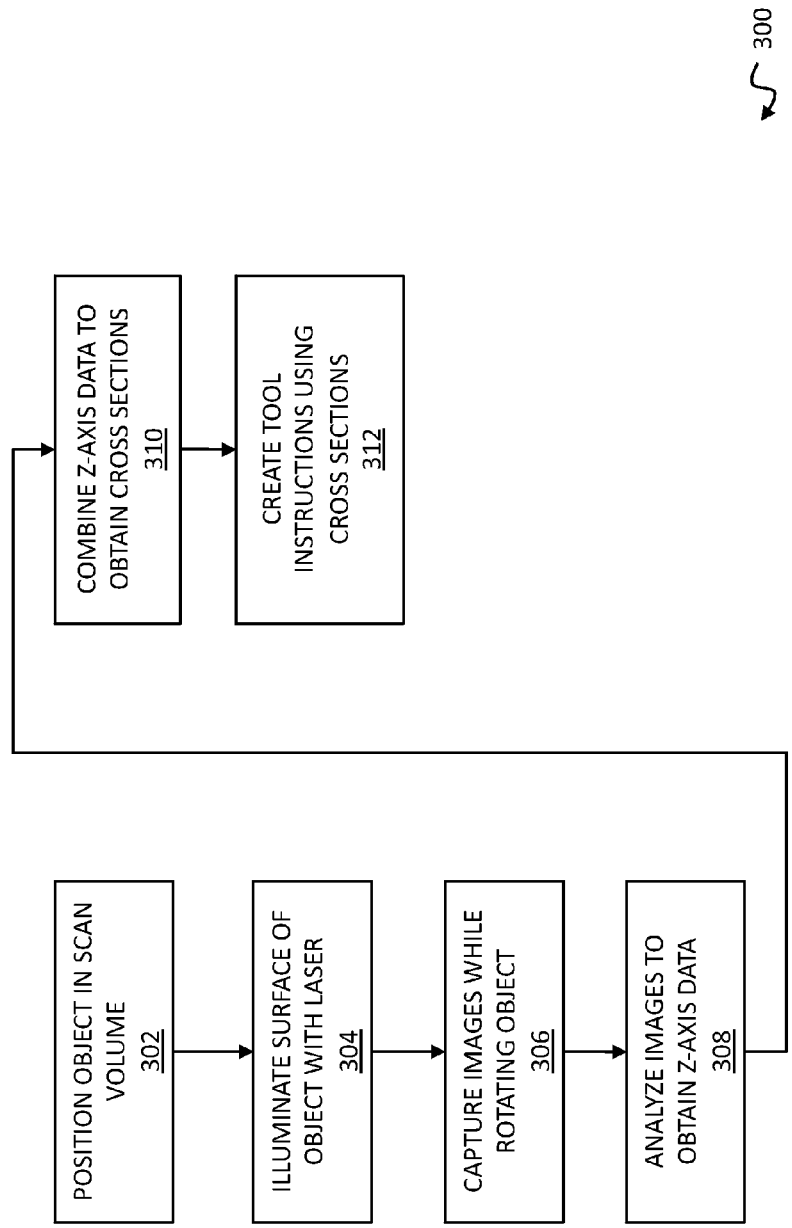
FIG. 3 shows a method for using laser line scan data in three-dimensional fabrication environment.

FIG. 3 shows a method for using laser line scan data in three-dimensional fabrication environment. By directly sampling three-dimensional data for cross sections of an object at predetermined z-axis positions, such as positions of layers of a three-dimensional fabrication process, data for tool instructions can be directly acquired without the need for intermediate processing such as creation of a polygonal mesh.

As shown in step 302, the process 300 may begin with positioning an object within a scan volume such as an interior of a three-dimensional scanner or a three-dimensional printer.

As shown in step 304, the process 300 may include illuminating a surface of the object with a laser line. This may for example, include illuminating the object using any of the laser line sources described above.

As shown in step 306, the process 300 may include capturing a plurality of images of the laser line on the surface while rotating the object about a first axis. The laser line may appear on the surface as a lit contour on the object in a plane of the laser line, and a camera may capture a number of images of the object from various poses (of the object relative to the laser line, and/or the camera). The first axis may conveniently be parallel to or the same as a z-axis of a fabrication system.

As shown in step 308, the process 300 may include analyzing the plurality of images to capture a three-dimensional measurement at each one of a number of z-axis positions along a second axis. This type of three-dimensional processing is well understood in the art, so the intricacies of and variations to such techniques are not chronicled here in detail. Using relatively simple geometric calculations, along with known positions of the camera relative to the laser line source, a position of the lit contour in an image field of the camera may be readily converted into three-dimensional data for the contour. Where z-axis positions for measurements are predetermined, the contour may be sampled for three-dimensional data at each z-axis position directly from a position of the contour within the image. In this manner, a number of measurements can be provided for each one of the z-axis positions. The second axis (for z-axis positions) may be the same as the first axis (for rotation of the object), such as where the scan volume is the working volume of a three-dimensional printer that has a rotating build platform.

As shown in step 310, the process 300 may include combining the plurality of measurements for one of the z-axis positions to provide a cross section of the object perpendicular to the second axis at that one of the z-axis positions. This cross section may include any number of points according to the rate at which images are captured relative to a speed of rotation of the object around the axis. In this manner, the process 300 may provide a digital representation of the object including a plurality of cross sections at a plurality of z-axis positions. The number of such points required for a sufficiently detailed cross section will of course depend upon the nature of the fabrication process for which the image is being obtained, or more generally the intended use of the cross-sectional data.

As shown in step 312, the process 300 may include creating tool instructions for a fabrication system to fabricate a copy of the object using at least a portion of the plurality of cross sections to reproduce the surface of the object. More generally, the cross sections may be used to characterize external dimensions of the object at a corresponding z-axis step of the fabrication process. This outline may, for example, directly define a tool path of a fused deposition modeling process or characterize an exterior limit of a slice of an object in a stereolithography process. Infilling for this two-dimensional boundary of the object may be completed using any suitable techniques to create an internal geometry for the fabricated copy of the object.

Figure 4:
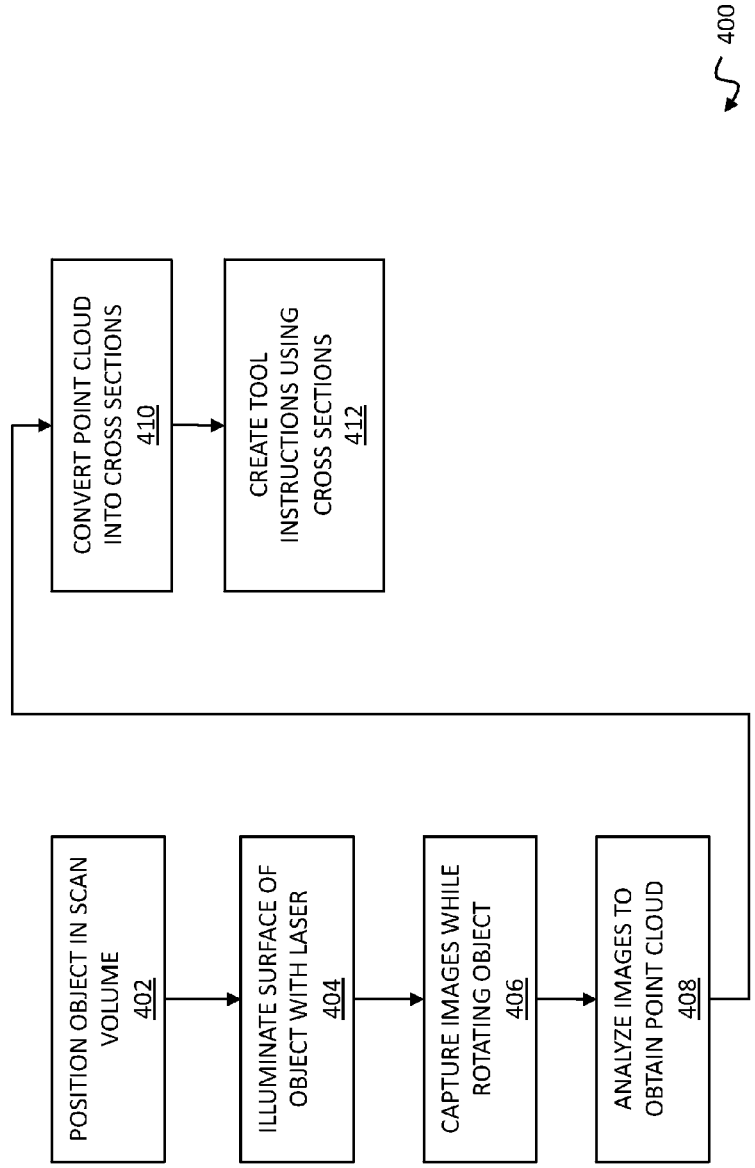
FIG. 4 shows a method for using laser line scan data in a three-dimensional

FIG. 4 shows a method for using laser line scan data in a three-dimensional fabrication environment. While the above process 300 generally contemplates direct conversion of laser line contours to tool instructions, it is also possible to capture a general point cloud from laser line scanning and then sample this point cloud at various z-axis positions to obtain cross sections that can be used as described above. While capturing a full point cloud for an object may require additional processing, it still avoids the need to create a polygonal mesh or other more complex interim representations, while providing greater flexibility in how data from the scan is processed into cross-sectional images useful for tooling.

As shown in step 402, the process 400 may begin with positioning an object within a scan volume. As shown in step 404, the process 400 may include illuminating a surface of the object with a laser line.

As shown in step 406, the process 400 may include capturing a plurality of images of the laser line on the surface while rotating the object about a first axis. Rotating the object around the first axis may include rotating a platform on which the object rests, such as a build platform of an additive fabrication system. Rotating the object around the first axis may also or instead include revolving a camera that captures the plurality of images around the object, or revolving a source of the laser line around the object.

As shown in step 408, the process 400 may include analyzing the plurality of images to provide a point cloud including a plurality of surface outlines of the object in three dimensions. To obtain a point cloud, each laser-illuminated contour may be processed as described above to obtain a number of points (in three-dimensions) along the contour for each image captured. These data sets may be registered to one another (e.g., based on known positions of the object, camera, and/or laser line source) to obtain a point cloud (comprised of the plurality of surface outlines) that more fully characterizing the exterior of the object. The point cloud may be filtered or otherwise processed to provide spatial smoothing, remove outliers, and so forth.

As shown in step 410, the process 400 may include converting the plurality of surface outlines in the point cloud into a plurality of cross sections, each one of the plurality of cross sections lying in a plane perpendicular to a second axis and at a different point along the second axis. That is, the point cloud representation may be sliced at various z-axis positions along the second axis to obtain cross sections. A variety of techniques may be employed in this step to determine, e.g., what points to include or exclude in the outline, such as where numerous points are in regions between different z-axis positions. The second axis may, for example, be the same as the first axis and/or the second axis may correspond to a z-axis of a fabrication process. Similarly, the plurality of cross sections may be spaced apart at a distance corresponding to a processing height of the fabrication process in order to facilitate tool instruction generation or other processing that is dependent upon the fabrication process for which the data is intended.

As shown in step 412, the process 400 may include creating tool instructions to fabricate a copy of the object using at least a portion of the plurality of cross sections to reproduce a shape of the surface. The tool instructions may, for example, include tool instructions for a three-dimensional printer using at least one of fused deposition modeling, stereolithography, DLP three-dimensional printing, and selective laser sintering.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
    positioning an object within a working volume of a three-dimensional printer;
    illuminating a surface of the object with a laser line;
        capturing a plurality of images of the laser line on the surface with a camera, wherein the camera is affixed to a toolhead of the three-dimensional printer and three-dimensionally positionable within the working volume using an x-y-z positioning assembly of the three-dimensional printer, the x-y-z positioning assembly configured to position the toolhead and the camera affixed thereto within the working volume for capturing surface data of the object used for a subsequent fabrication with the toolhead along a toolpath;
        analyzing the plurality of images to provide a point cloud representing a three-dimensional surface of the object and including a plurality of cross sections of the object, each one of the plurality of cross sections lying in a plane perpendicular to a z-axis of the three-dimensional printer and each one of the plurality of cross sections intersecting the z-axis at a different point; and
        creating tool instructions for a fabrication system to fabricate a copy of at least a portion of the object using at least a portion of the plurality of cross sections to reproduce the surface of the object, the tool instructions created directly from the point cloud without use of interim computer models.

2. The method of claim 1 wherein the plurality of cross sections are spaced apart at a distance corresponding to a processing height of a fabrication process used by the three-dimensional printer.

3. The method of claim 1 wherein the toolhead is an extruder.

4. The method of claim 1 wherein the three-dimensional printer uses at least one of fused deposition modeling, stereolithography, DLP three-dimensional printing, and selective laser sintering.

5. The method of claim 1 further comprising rotating the object around a first axis.

6. The method of claim 5 wherein rotating the object around the first axis includes rotating a platform on which the object rests.

7. The method of claim 6 wherein the platform is a build platform of an additive fabrication system.

8. The method of claim 5 wherein rotating the object around the first axis includes revolving a source of the laser line around the object.

9. The method of claim 1 wherein illuminating the object includes directing light from a laser through a lens that distributes the light across a plane.

10. The method of claim 1 wherein illuminating the object includes directing light from a laser toward a moving mirror that oscillates to direct the light across a plane.

11. A device comprising:
    a three-dimensional printer having a working volume;
    a build platform within the working volume, the build platform including a planar surface positioned to receive an object;
    a laser line projector directed toward the working volume;

a camera affixed to a toolhead of the three-dimensional printer and three-dimensionally positionable within the working volume using an x-y-z positioning assembly of the three-dimensional printer, the x-y-z positioning assembly configured to position the toolhead and the camera affixed thereto within the working volume for capturing surface data of the object used for a subsequent fabrication with the toolhead along a toolpath; and a controller configured to coordinate operation of the laser line projector and the camera to capture three-dimensional data from a surface of the object within the working volume using illumination of the object by the laser line projector, thereby providing three-dimensional surface data for the object, the controller is further configured to extract a number of two dimensional outlines of the object at a number of positions along the axis from the three-dimensional data, thereby providing planar outline data, and the controller is further configured to generate tool instructions directly based on the planar outline data without use of interim computer models to fabricate a three-dimensional copy of the surface of the object.

12. The device of claim 11 wherein the tool instructions include a tool path for a fused deposition modeling process.

13. The device of claim 11 wherein the three-dimensional printer fabricates objects using at least one of fused deposition modeling, stereolithography, DLP three-dimensional printing, and selective laser sintering.

14. The device of claim 11 wherein the three-dimensional surface data includes a point cloud of the surface of the object.

15. The device of claim 11 wherein the three-dimensional data includes a plurality of cross-sections of the surface of the object at a plurality of predetermined positions along an axis through the working volume.

* * * * *

UNITED STATES PATENT AND TRADEMARK OFFICE
CERTIFICATE OF CORRECTION

PATENT NO.        : 9,789,649 B2                                              Page 1 of 1
APPLICATION NO. : 13/786051
DATED             : October 17, 2017
INVENTOR(S)       : Buser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this
Twenty-fifth Day of September, 2018

Andrei Iancu
*Director of the United States Patent and Trademark Office*